March 6, 1934.  A. DINA  1,949,458

FRAMING MECHANISM FOR MOTION PICTURE PROJECTORS

Filed May 8, 1931  7 Sheets-Sheet 5

INVENTOR
Augusto Dina
BY his ATTORNEYS

March 6, 1934. A. DINA 1,949,458

FRAMING MECHANISM FOR MOTION PICTURE PROJECTORS

Filed May 8, 1931 7 Sheets-Sheet 6

INVENTOR
Augusto Dina
BY his ATTORNEYS

Patented Mar. 6, 1934

1,949,458

UNITED STATES PATENT OFFICE 1,949,458

FRAMING MECHANISM FOR MOTION PICTURE PROJECTORS

Augusto Dina, Elizabeth, N. J., assignor to International Projector Corporation, New York, N. Y., a corporation of Delaware Application May 8, 1931, Serial No. 535,865

14 Claims. (Cl. 88—17)

This invention relates to motion picture apparatus and has particular reference to a new and useful mechanism for framing the film and driving the shutter whether the machine is a projector or camera or other film carrying device.

This invention is related to the invention described in my copending application Ser. No. 465,349, filed July 2, 1930, entitled "Framing mechanism for motion picture projectors".

A main object of the invention herein is to provide a novel type of film sprocket and shutter driving mechanism that is simple and which at all times permits framing of the film and adjustment of the shutter for varying the relation of the film sprocket and shutter driving operation to the mechanism. Some portions of the structure herein simulate some of the structures in the copending application above noted.

A further object of the invention is to provide simple, efficient, compact framing mechanism which will permit instant and ready framing even while the machine is running and which can readily and easily be operated with a minimum of effort and expenditure of time and with a high degree of accuracy and with a fineness of adjustment desirable on any high grade machine.

A still further object is to provide a simple and efficient mechanism whereby the framing of the film with respect to the film gate or aperture may be simple, easily and effectively achieved without affecting in any material manner the cyclic relation which exists in timing between the framing mechanism and the shutter timing mechanism. In other words, the timing of the shutter with respect to the optical beam and the operating mechanism is not affected by the framing or adjustment of the film.

A further object is to provide an improved film supporting plate for the shutter and control shaft and means for oscillatably supporting said plate from the frame of the machine.

Further and more specific objects, features and advantages will more clearly appear from a consideration of the specification hereinafter taken in connection with the accompanying drawings which form part of the specification and which illustrate a present preferred form of the invention.

Briefly, the invention concerns the provision of a main driving shaft directly connected to the shutter shaft of a motion picture projector or similar machine. The shutter shaft is directly geared to the pin wheel shaft of an intermittent mechanism of the machine with the governing fly wheel mounted on and driven with the pin wheel shaft. The intermittent mechanism is disposed in a box or housing or frame which may be rotated so that the pin wheel shaft moves around the center of the box in a predetermined arc of movement. On the machine is another and practically similar box or housing containing a shaft on which is a fixed gear. This latter shaft is located exactly the same distance from the center of its box and moves in the same arc. Means are provided to connect to the two boxes or housings so that as the one with the fixed gear is moved or rotated the other will be moved in the same direction and to the same extent. The fixed gear on the second housing is meshed with a control shaft by means of a straight rack of cylindrical type and this control shaft is connected with the shutter shaft so that the movement thereof is controlled. The mechanism which rotates one or the other box or housing is so related and associated with the other mechanism that the pin wheel position may be changed and in so doing the position of the associated star wheel and the film sprocket can be altered to frame or change the sprocket position with respect to its position regarding outside fixed elements such as the film gate which is fixed and this can be done without changing the relations between the pin wheel, the star wheel, and the shutter shaft as to their instantaneous timing at the instant of changing and even during the framing change. The control shaft comes into effect to permit the change thus described without changing the angular position of the shutter. The disposition and position of the control shaft is such that it can be turned or rotated itself to independently turn the shutter when desired to change its time relations with respect to the intermittent mechanism or with respect to the projection beam of light when desired.

Figs. 7 and 8 are similar sections on the lines 7—7 and 8—8 of Fig. 2; and

As shown in the drawings the present preferred form of the invention is applied to a motion picture projector the head of which has a central mechanism supporting partition or wall 10. This apparatus includes the usual upper magazine 11 mounted on the upper part of the partition 10, and the lower film magazine 12. The main drive shaft 13 is vertically disposed and actuated through suitable gearing not shown from a motor 15 mounted on the base 16 at the bottom of the partition 10. Also mounted on the partition 10 are the upper film sprocket 18, the intermittent film sprocket 19, the lower film sprocket 20, the shutter shaft 21 and the shutter guard casing 22. The drive of the mechanism moves the shutter shaft 21 in cooperation with the mechanism. The adjustment of the apparatus to frame the film will be hereinafter described.

Figure 4:
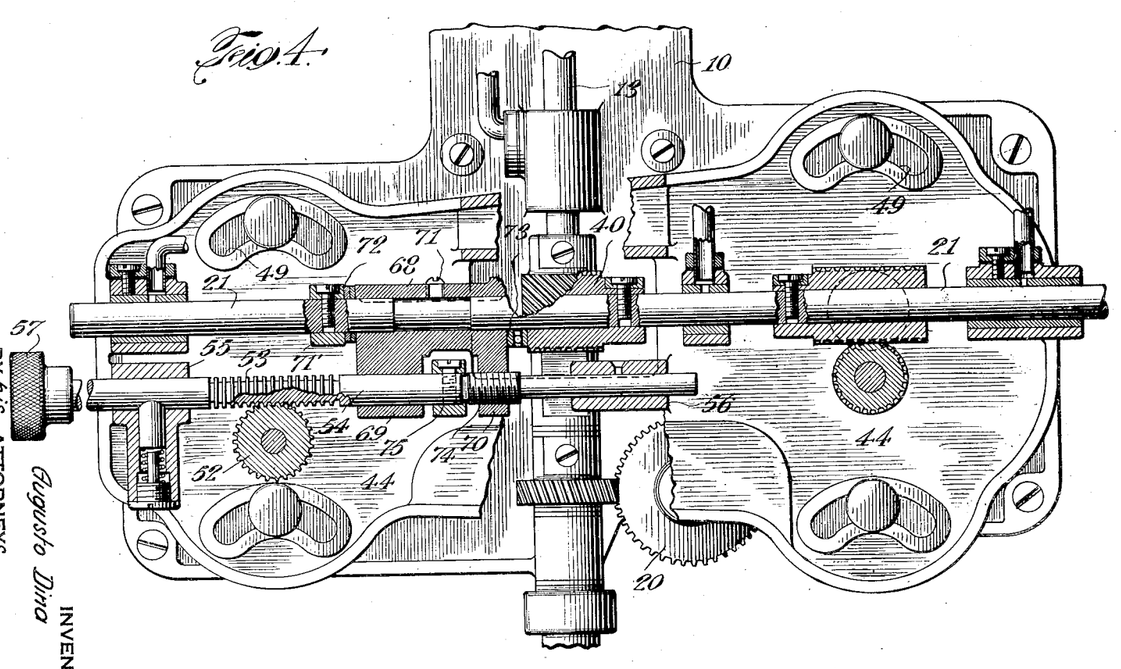
Fig. 4 is a side elevation similar to Fig. 2 but showing certain parts in section.
Figure 5:
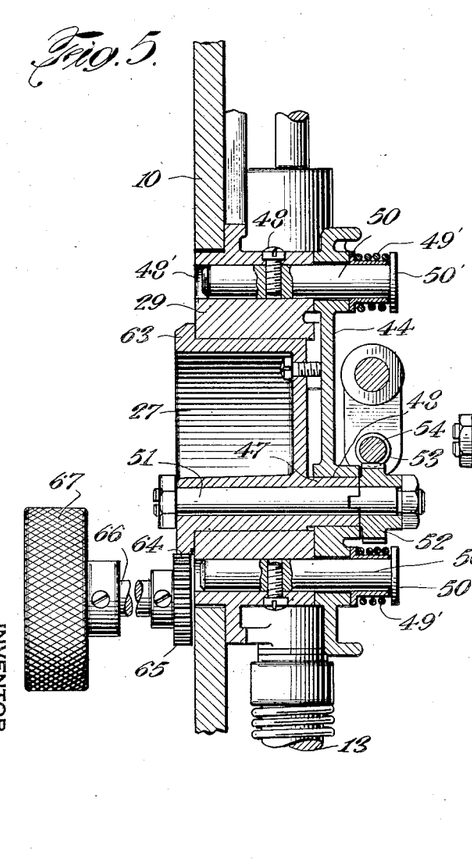
Fig. 5 is a vertical cross-section on the line 5—5 of Fig. 2.
Figure 6:
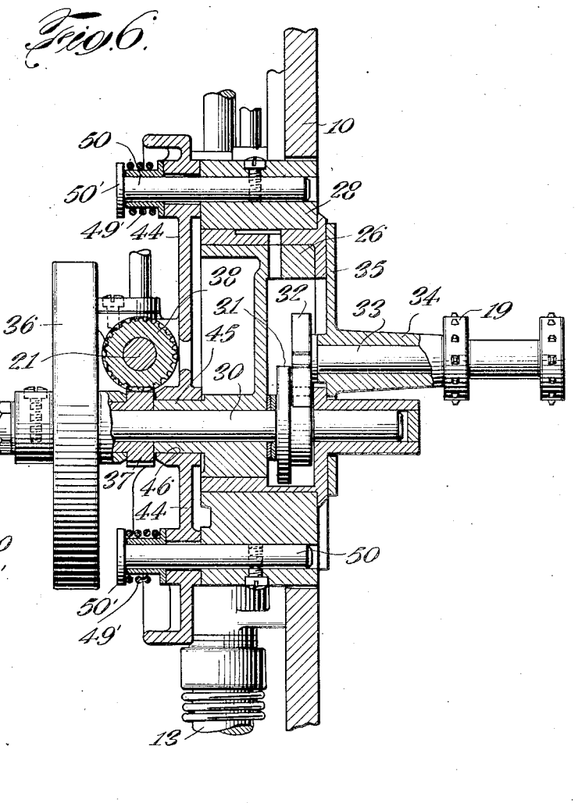
Fig. 6 is a similar section on the line 6—6 of Fig. 2.
Figure 7:
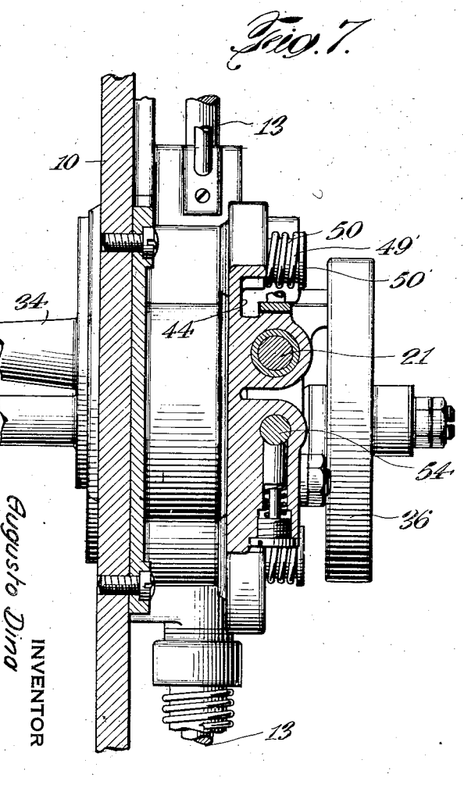
Figure 9:
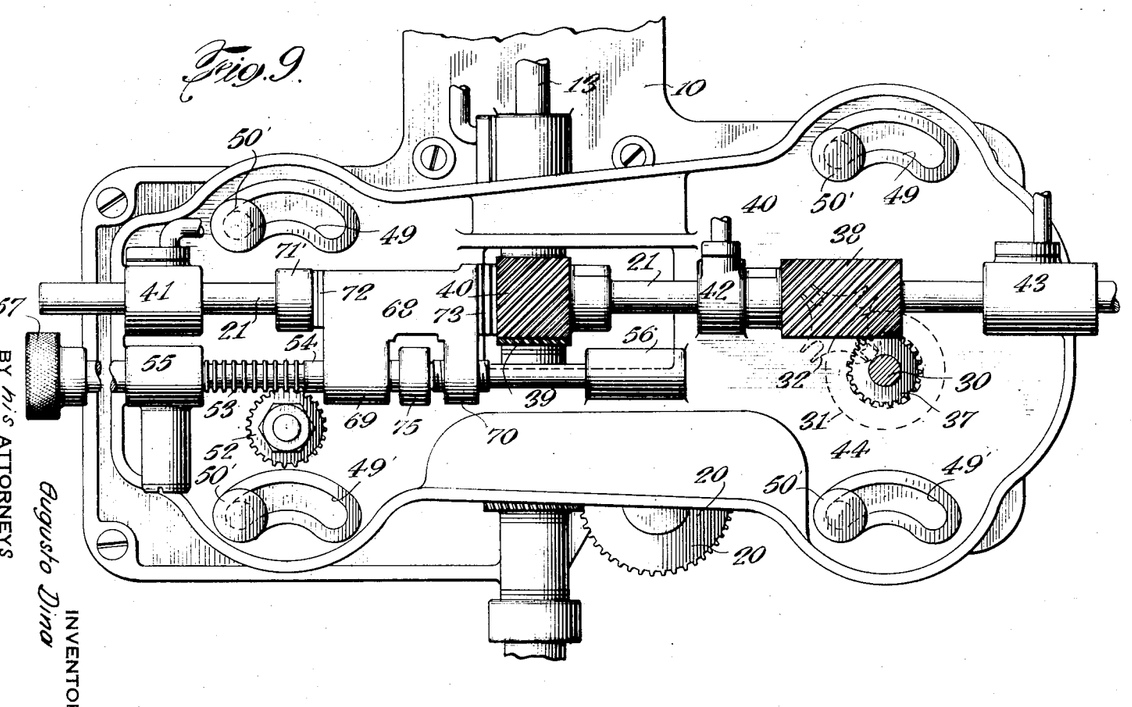
Fig. 9 is a view somewhat similar to Fig. 2 showing the parts in one extreme adjusted position.

The mechanism shown in detail in Figs. 2 to 9, inclusive, shows a solid head or partition 10 inside of which are two circular housings or rotatable boxes 26 and 27 and they are disposed in suitable journals 28 and 29 which open both at the front and rear. In the journals are the rotatable box members 26 and 27 snugly disposed therein. As shown in Fig. 6 the rotatable casing or box 26 receives rotatably a shaft 30 on which a pin wheel 31 of the usual type is fixed. This pin wheel meshes with a star wheel 32 mounted on the shaft 33. Disposed centrally of the axis of the box 26 and journalled in the sleeve 34 is mounted a plate 35 fastened to the box 26 by any suitable means.

On the other end of the pin wheel shaft 30 there is disposed a fly wheel 36 which regulates and smooths the motion of the intermittent mechanism. Also a gear 37 preferably a worm gear is disposed on the shaft 30 and meshes with a worm gear 38. This worm gear 38 is mounted on the shutter shaft 21 above mentioned. This shutter shaft 21 is driven directly from the main drive shaft 13 by means of the meshing of the gear 39 on the drive mechanism with a gear 40 on the shutter shaft 21. These last two gears are preferably of the worm type. This shutter shaft is journalled at spaced points along its length in journal elements such as 41, 42 and 43 which are disposed on one face of the journals 28 and 29 and is respectively connected to the boxes 26 and 27. This plate is connected to the box 26, as seen in Fig. 6, by means of a sleeve-like extension 45 extending through a bore 46 in the plate. This same sleeve-like extension 45 acts as a bearing for the shaft 30.

Referring to Fig. 5 it will be seen that the box 27 has a sleeve-like extension 47 received in the bore 48 in the plate 44. The plate 44 is provided adjacent its four corners with curved slots 49 (see Fig. 4) and on which ride stub shafts 50 fastened by means of set screws 48 in bores 48' formed in the journal members 28 and 29. Springs 49' lie around the stub shafts 50 between the head 50' thereon and against plates 44 tending to hold the plate 44 in position.

Referring to Fig. 5 it will be seen that the box 27 is journalled in the journal element 29. This box receives the shaft 51 which is fixed non-rotatably in the box. The axis of this shaft is eccentric with respect to the axis of box 27. This shaft 51 has on one end a gear 52 fixed thereto and meshing with a gear 53 on the control shaft 54. This control shaft is journalled on the plate 44 in journals 55 and 56. At one end of the control shaft 54 there is an operating handle 57. The gear 53 is preferably a straight rack gear such as seen in Fig. 4. It will be observed that the control shaft 54 and the shutter shaft 21 are at different levels on the plate 44 although they are both preferably horizontal. It will also be noticed that the boxes 26 and 27 are both of the same diameter and that the arc of swing of the pin wheel shaft 30 and the arc of swing of the shaft 51 are the same although these boxes are not at the same horizontal level on the plate 44. Therefore, when the box 27 is rotated its connection with the plate 44 will rotate the box 26 and will swing the pin wheel shaft 30 through the same arc as that through which the shaft 51 is swung by the movement of the box 27. The plate 44 is constrained as noted above against the face of the box by means of the springs 49'. The curvature of the slots 49 in the plate 44 is of the same radius as the radius of swing of the shafts 30 and 51. One face of the box 27 is provided with a flange 63 the lower portion of which is provided with teeth 64 engaged by teeth on a gear 65 on a shaft 66 journalled on the partition 10 and having an operating handle 67 to turn it. When the shaft 66 is turned this box 27 is rotated.

Referring to Figs. 4 and 6 particularly, it will be seen that the control shaft 54 is connected to the shutter shaft 21 by means of a yoke member having a main body portion 68 and two opposite spaced legs or limb portions 69 and 70. The yoke 68 is held in position on shaft 21 by means of a set screw 71, which extends into a slight slot in the shaft 21 so that the yoke can be slightly adjusted along the shaft 21 if desired. The yoke member 68 is further held in position by means of collar 71' and by ring washers such as 72 and 73, disposed at opposites thereof. One of the legs 70 is threaded and engages with threads 74 on the shaft 54 at that point so that as the shaft 54 is turned by the handle 57 the yoke member 68 may be moved longitudinally and the shaft 21 thus turned angularly as will be hereinafter explained. A collar 75 fixed to the shaft 54 between the legs 69 and 70 will prevent too much movement of the yoke member 68 in either direction.

*Operation*

Figure 1:
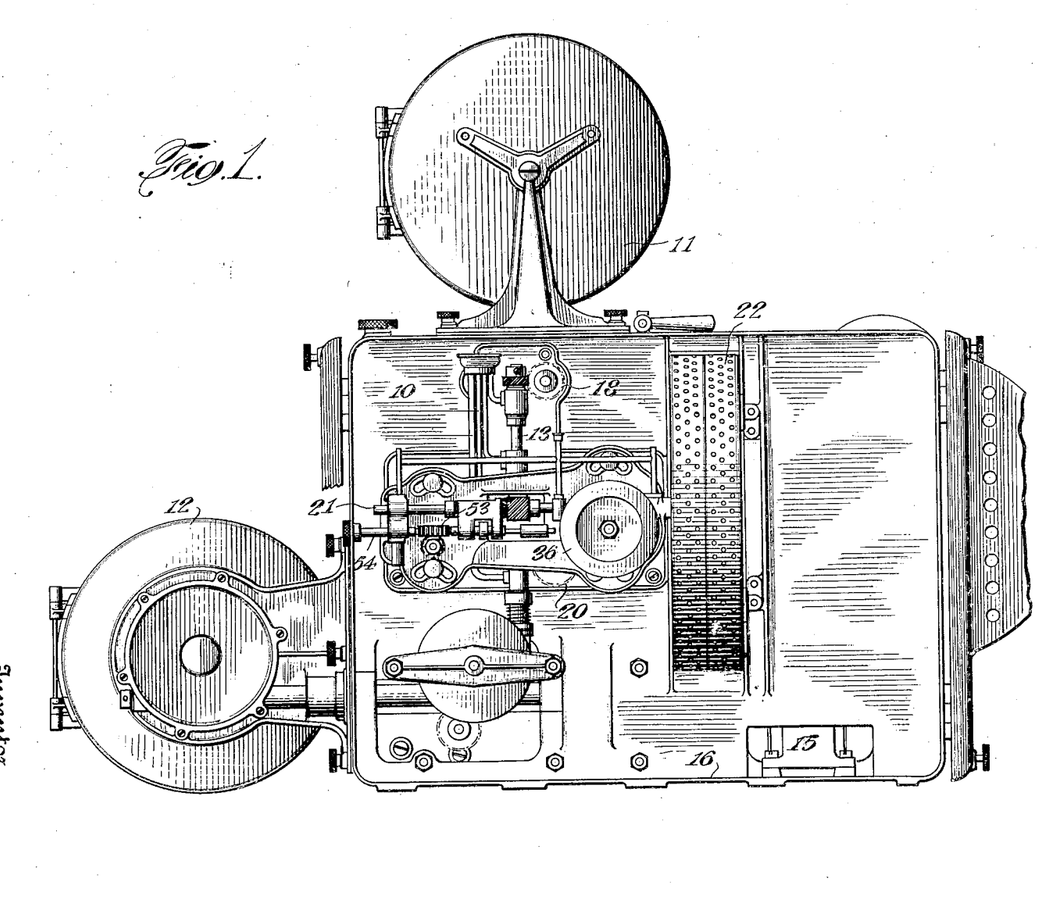
Fig. 1 is a side elevation of the projector looking toward the side on which the framing mechanism is shown.
Figure 2:
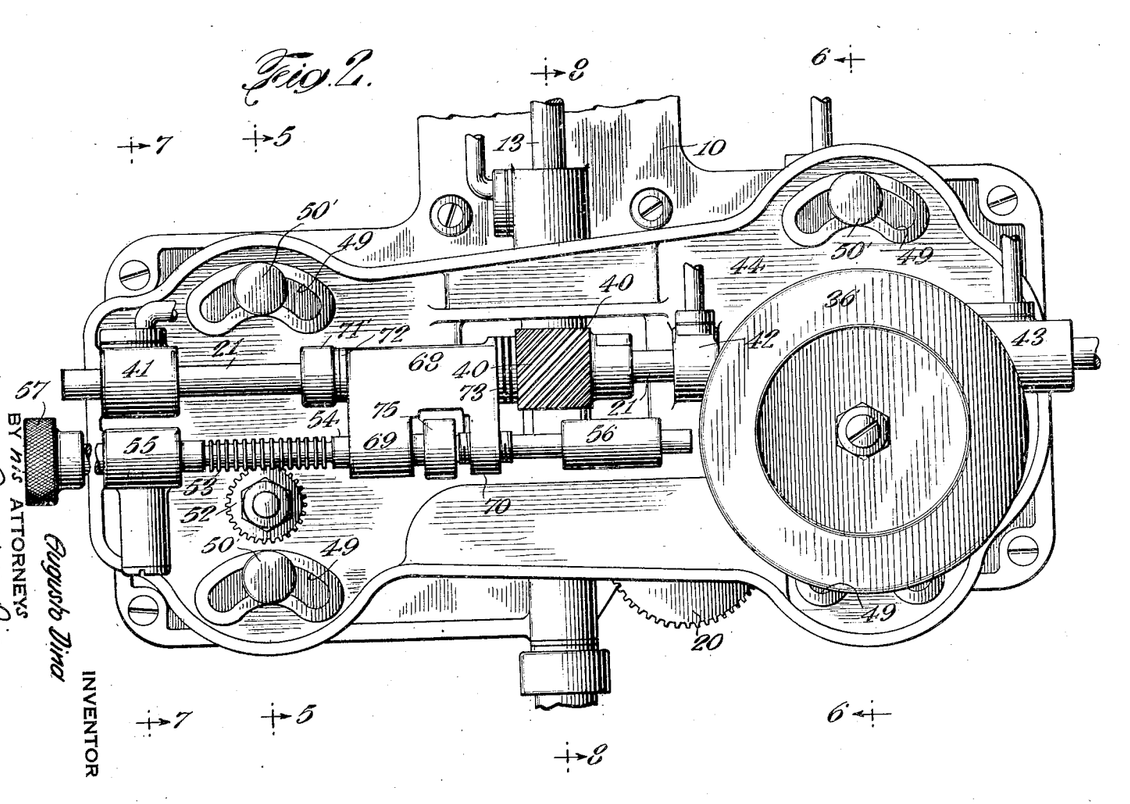
Fig. 2 is an enlarged side elevation of the framing mechanism.
Figure 3:
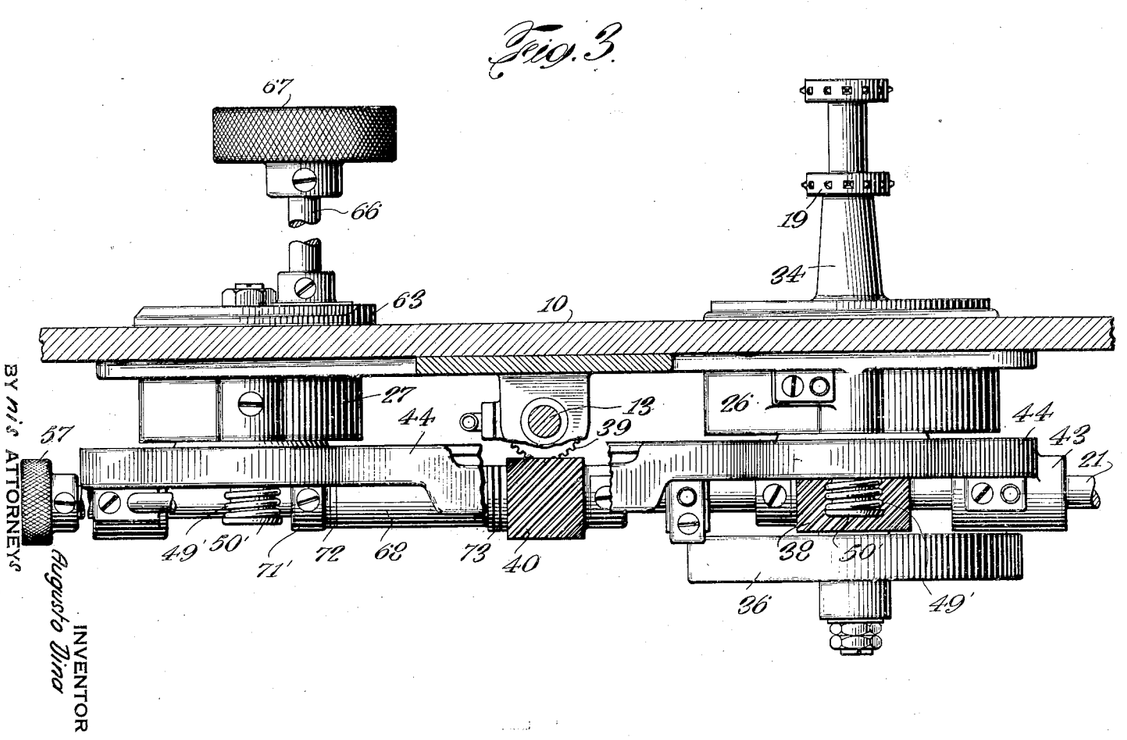
Fig. 3 is a plan view of mechanism shown in Fig. 2.

With the parts in the position shown in Figs. 2 and 4 which can be called a neutral position, it is desired to frame the film with respect to the film gate. The handle 67 is turned and acts through the intermediary of the gear 65 to turn the box 27. The plate 44 is supported on the extension 47 of the box 27 as previously stated and extends across to the box 26 from which the plate 44 is supported on extension 45. This connection of the plate 44 between the two boxes and the provision of the curved slots 49 associated with the stub shafts 50 and the journals 28 and 29 permits the plate to be swung as the box 27 is rotated. The movement of the plate, therefore, tends to turn the box 26 in a similar manner. This swinging movement of the plate 44 will cause the box 26 to rotate around its center and will cause the sleeve 45 on the shaft 30 to move in an arc with the axis of the box 26 as a center. This will tend to rotate the shaft 33 and sprocket 19 to frame the film.

As the box 27 is rotated the gear 52 fixed thereon will turn and will roll along the teeth 53 on the control shaft 54 slightly raising the control shaft as the plate 44 is slightly raised and lowered in its swinging motion. The connection between the shaft 54 and the shutter shaft 21 through the yoke 68 will prevent the shutter from moving any substantial amount longitudinally and will, therefore, cause the gear 37 to roll over the worm 38 as the pin wheel shaft 39 with the gear 37 is swung with the box 26. Since the gear 52 and the gear 37 are of the same diameter and have the same arc of swing the rolling movement of the gear 52 over the teeth 53 will exactly be similar to the rolling movement of the gear 37 over the worm 38.

Since the gear 52 is fixed to the box 27 and does not turn independently thereof, it will be seen that the movement of the star and the pin wheel shaft will thus be with the box 26 and not separate therefrom. Therefore, the angular relations between the pin wheel shaft and box 26 will not be changed as the film is framed and therefore the internal relations between the pin wheel 31 and the star wheel 32 are not changed during the framing action. Also the shutter shaft in its position and timing relation to the intermittent mechanism during framing is not changed. Also the inter-system-cyclic relations are not changed during framing although the extra-system-cyclic relations of the sprocket 19 are changed with regard to a point outside the system, namely the film gate.

When it is desired to turn the shutter shaft 21 to change the timing of the shutter with respect to the other elements of the system, then it becomes necessary to turn the control shaft 54 through the intermediary of the handle 57. This turning causes the movement of the yoke 68 by means of the threads 74. This longitudinal movement of the shutter shaft 21 will cause the worm 38 to ride over the worm gear 37 and this relative motion will cause the worm 38 to turn slightly and this will cause the turning of the shutter shaft 21, the amount of turning of the handle 57 determining the amount to which the shutter shaft is turned as desired.

The plate 44 preferably is supported at four points through the association of the slots 49 with the stub shafts 50 connected to the journals 28 and 29 and the fact that the curvature of the slots 49 is the same as the swing curvature of the shafts 51 and 30 permits the plate thus to be supported in a simple, efficient, compact manner to insure the exact cooperation of the parts during this movement.

Thus, this improved drive and framing device provides a simple and direct connection between the shutter shaft and the pin wheel shaft. The pin wheel shaft carries the fly wheel and is swung around a definite arc with the shutter. The shutter shaft is prevented from turning during this swinging movement by means of the control shaft which swings in exactly the same arc and is connected to the shutter shaft. The pin wheel is prevented from turning with respect to the star wheel by forcing it to roll over the shutter worm with a pure rolling action which is forced by the connection with the control shaft, the motion of which is controlled by the mesh between the gear 52 and the teeth 53.

While the invention has been described in detail and with respect to the present preferred form thereof, it is not to be limited to such details and forms since many changes may be made and the invention embodied in other forms and modifications without departing from the spirit and scope of the invention in its broadest aspects. Hence it is desired to cover any and all forms and modifications of the invention coming within the language or scope of any one or more of the appended claims.

What is claimed, is:

1. In a framing device for motion picture machines having a supporting partition, a pair of spaced rotatable casings or boxes supported from said partition, shafts eccentrically mounted in said boxes and extending therefrom, a plate extending between said boxes and having journals for said shafts, said plate having slots therein, stub shafts mounted on the partition, and having parts thereof extending through said slots to guide the movement of the plate as the boxes are rotated and means for rotating one of said boxes.

2. In a framing device for motion picture machines having a supporting partition, a pair of spaced rotatable casings or boxes disposed thereon, shafts eccentrically mounted on and extending from said boxes, a plate extending between said boxes and having journals to receive said extending eccentric shafts, said plate having a plurality of curved slots therein, the radius of said slots being the same as the radius of eccentricity of the shafts extending from said boxes, stub shafts mounted on said partition and extending through said slots to guide the movement of said plate, and means on the said partition and engaging one of said boxes to permit its rotation.

3. In a framing device for motion picture machines having a supporting partition, a pair of spaced casings or boxes, a pin wheel shaft disposed off center in one box, a gear on said pin wheel shaft, a shutter shaft, a gear on said shutter shaft, meshing with the gear on the pin wheel shaft, a gear non-rotatably fixed to the second box, a plate connecting the boxes for joint movement and having curved slots, and stub shafts on the partition lying in said slots as guides, means for rotating one of said boxes, a control shaft, said control shaft engaging the fixed gear, and means connecting the control and the shutter shafts.

4. In a framing device for motion picture machines having a supporting partition, a pair of spaced casings or boxes, one of the boxes housing an intermittent mechanism including an offset pin wheel shaft, an equally offset shaft non-rotatably fixed to the second box, a plate connecting the boxes for joint movement and having curved slots, and stub shafts on the partition lying in said slots, means for rotating one of the boxes, a shutter shaft directly geared to the pin wheel shaft, a control shaft directly geared to the pin wheel shaft, and means connecting the shutter and the control shafts.

5. In a framing device for motion picture machines having a supporting partition, a pair of spaced casings or boxes, equally offset shafts on said boxes, the shaft on one box rotatable thereon, the shaft on the other box fixed therein, a plate connecting the boxes for joint movement and having curved slots, and stub shafts on the partition lying in said slots, a control shaft engaging the fixed shaft, a shutter shaft engaging the shaft on the other box, and means connecting the control and the shutter shafts.

6. In a framing device for motion picture machines having a supporting partition, a pair of spaced casings or boxes, equally offset shafts on said boxes, the shaft on one box rotatable thereon, the shaft on the other box fixed thereon, a plate connecting the boxes for joint movement and having curved slots, and stub shafts on the partition lying in said slots, a control shaft engaging the fixed shaft, a shutter shaft engaging the shaft on the other box, means connecting the control and the shutter shafts, and means for driving the shutter shaft.

7. In a framing device for motion picture machines having a supporting partition, a pair of spaced casings or boxes, equally offset shafts on said boxes, the shaft on one box rotatable thereon, the shaft on the other box fixed thereon, a plate connecting the boxes for joint movement and having curved slots, and stub shafts on the partition lying in said slots, a control shaft engaging the fixed shaft, a shutter shaft engaging the shaft on the other box, means connecting the control and the shutter shafts, and means for turning the control shaft independent of the swinging movement of the boxes.

8. In a framing device for motion picture machines having a supporting partition, a pair of spaced casings or boxes, equally offset shafts on said boxes, the shaft on one box rotatable thereon, the shaft on the other box fixed thereon, a plate for connecting the boxes for joint movement and having curved slots, and stub shafts on the partition lying in said slots, a control shaft engaging the fixed shaft, a shutter shaft engaging the shaft on the other box, means connecting the control and the shutter shafts, means for driving the shutter shaft, and means for turning the control shaft independent of the swinging movement of the boxes.

9. In a framing device for motion picture machines having a supporting partition, a rotatable intermittent box or casing, a pin wheel shaft rotatably offset therein, a gear on the pin wheel shaft, a shutter shaft, a gear on said shutter shaft meshing with the gear on the pin wheel shaft, a second rotatable casing or box, a shaft non-rotatably fixed in said second box and offset equally from the center thereof, a plate connecting the boxes and movable therewith, said plate having curved slots therein, and stub shafts on the partition extending into said slots to guide the plate, the shutter shaft journalled on said plate, a control shaft journalled on said plate, a gear on said control shaft, a gear on the fixed non-rotatable shaft and meshing with it, a yoke member connecting the shutter and the control shafts, and threaded means connecting the yoke and the control shaft to permit the movement of the control shaft to adjust the shutter shaft independent of the rotation of the boxes.

10. In a framing device for motion picture machines having a supporting partition, a rotatable intermittent box or casing, a pin wheel shaft rotatably offset therein, a gear on the pin wheel shaft, a shutter shaft, a gear on said shutter shaft meshing with the gear on the pin wheel shaft, a second rotatable casing or box, a shaft non-rotatably fixed in said second box and offset equally from the center thereof, a plate connecting the boxes and movable therewith, said plate having curved slots therein, and stub shafts on the partition extending into said slots to guide the plate, the shutter shaft journalled on said plate, a control shaft journalled on said plate, a gear on said control shaft, a gear on the fixed non-rotatable shaft and meshing therewith, a yoke member connecting the shutter and the control shafts, threaded means connecting the yoke and the control shaft to permit movement of the control shaft to adjust the shutter shaft independent of the rotation of the boxes, and means for driving the shutter shaft.

11. In a framing device for motion picture machines having a supporting partition, a rotatable intermittent casing or box, a pin wheel shaft rotatably offset therein, a gear on the pin wheel shaft, a shutter shaft, a gear on said shutter shaft meshing with the gear on the pin wheel shaft, a second rotatable casing or box, a shaft non-rotatably fixed on said second box, and offset equally from the center thereof, a plate connecting the boxes and movable therewith, said plate having curved slots therein, and stub shafts on the partition extending into said slots to guide the plate, the shutter shaft journalled on said plate, a control shaft journalled on said plate, a gear on said control shaft, a gear on the fixed non-rotatable shaft and meshing therewith, a yoke member connecting the shutter and the control shafts, threaded means connecting the yoke and the control shaft to permit the movement of the control shaft to adjust the shutter shaft independent of the rotation of the boxes, and means for rotating one of said boxes.

12. In a framing device for motion picture machines having a supporting partition, a rotatable intermittent casing or box, a pin wheel shaft rotatably offset therein, a worm gear on the pin wheel shaft, a shutter shaft, a worm on said shutter shaft meshing with the worm gear on the pin wheel shaft, a second rotatable casing or box, a shaft non-rotatably fixed on said second box, and offset equally from the center thereof, a plate connecting the boxes and movably therewith, said plate having curved slots therein, and stud shafts on the partition extending into said slots to guide the plate, the shutter shaft journalled on said plate, a control shaft journalled on said plate, a gear on said control shaft, a gear on the fixed non-rotatable shaft and meshing therewith, a yoke member connecting the shutter and the control shafts, threaded means connecting the yoke member and the control shaft to permit the movement of the control shaft to adjust the shutter shaft independent of the rotation of the boxes.

13. In a framing device for motion picture machines having a supporting partition, a rotatable intermittent box or casing, a pin wheel shaft rotatably offset therein, a worm gear on the pin wheel shaft, a shutter shaft, a worm on said shutter shaft meshing with the worm gear on the pin wheel shaft, a second rotatable casing or box, a shaft non-rotatably fixed on said second box, and offset equally from the center thereof, a plate connecting the boxes and movable therewith, said plate having curved slots therein, and stub shafts on the partition extending into said slots to guide the plate, the shutter shaft journalled on said plate, a gear on said control shaft, a gear on the fixed non-rotatable shaft and meshing therewith, a yoke member connecting the shutter and the control shafts, threaded means connecting the yoke member and the control shaft to permit movement of the control shaft to adjust the shutter shaft independently of the rotation of the boxes, and means for driving the shutter shaft.

14. In a framing device for motion picture machines having a supporting partition, a rotatable intermittent box or casing, a pin wheel shaft rotatably offset therein, a regulating fly wheel on said pin wheel shafts, a gear on said pin wheel shaft, a shutter shaft, a gear on said shutter shaft, meshing with the gear on the pin wheel shaft, a second rotatable casing or box, a shaft non-rotatably fixed on said second box and offset equally from the center thereof, a plate connecting the boxes and movable therewith, said plate having curved slots therein, and stub shafts on the partition extending into said slots to guide the plate, the shutter shaft journalled on said plate, a control shaft journalled on said plate, a gear on said control shaft, a gear on the fixed non-rotatable shaft and meshing therewith, a yoke member connecting the shutter and the control shafts, and threaded means connecting the yoke member and the control shaft to permit movement of the control shaft to adjust the shutter shaft independent of the rotation of the boxes.

AUGUSTO DINA.